(12) United States Patent  (10) Patent No.: US 7,517,088 B1
Kretzschmar et al.  (45) Date of Patent: Apr. 14, 2009

(54) LIGHT PROJECTOR

(75) Inventors: Thomas E. Kretzschmar, 107 Cherrywood St., Bellaire, Harris County, TX (US) 77401; John T. Petrick, New Port Richey, FL (US); Richard A. Wolfe, Houston, TX (US)

(73) Assignee: Thomas E. Kretzschmar, Bellaire, TX (US)

( * ) Notice: Subject to any disclaimer, the term of this patent is extended or adjusted under 35 U.S.C. 154(b) by 516 days.

(21) Appl. No.: 11/287,730

(22) Filed: Nov. 28, 2005

(51) Int. Cl.
*G03B 29/00* (2006.01)
*G03B 21/16* (2006.01)
*G03B 21/20* (2006.01)
*G03B 21/28* (2006.01)
*G03B 21/36* (2006.01)
*F21S 8/00* (2006.01)
*F21V 29/00* (2006.01)
*F21V 7/00* (2006.01)

(52) U.S. Cl. .................... 353/43; 353/39; 353/61; 353/97; 353/98; 353/100; 353/102; 362/264; 362/268; 362/341; 362/373

(58) Field of Classification Search .............. 353/43, 353/39, 52, 61, 88, 97, 100, 102, 119; 362/267, 362/268, 321, 364, 365, 375, 580, 547, 217, 362/218, 264, 294, 345, 362, 373, 317, 157, 362/257, 227, 109, 84, 551, 382, 341
See application file for complete search history.

(56) References Cited

U.S. PATENT DOCUMENTS

| 2,210,391 | A | | 8/1940 | Wendel | 362/268 |
| 2,354,237 | A | | 7/1944 | Wendel | 362/267 |
| 2,481,054 | A | | 6/1949 | Wendel | 239/18 |
| 2,764,058 | A | * | 9/1956 | Ellis | 353/43 |
| 3,984,849 | A | | 10/1976 | Guillaume | 395/305 |
| 4,110,036 | A | | 8/1978 | Guillaume | 355/32 |
| 4,210,955 | A | | 7/1980 | Labrum | 362/321 |
| 4,217,047 | A | | 8/1980 | Jacksen et al. | 396/4 |
| 4,468,720 | A | | 8/1984 | Arai | 362/281 |
| 4,636,925 | A | | 1/1987 | Kristofek | 362/277 |
| 5,510,969 | A | | 4/1996 | Rodger et al. | |
| 5,957,572 | A | | 9/1999 | Wedekind et al. | 362/365 |
| 5,980,066 | A | | 11/1999 | Belliveau et al. | 362/281 |
| 6,048,080 | A | | 4/2000 | Belliveau | 362/282 |

(Continued)

FOREIGN PATENT DOCUMENTS

GB    2265975 A    10/1993

(Continued)

OTHER PUBLICATIONS

"Wendelighting Model 1180 Optical Projector Track Lighting System" flier of Wendelighting Division of Jacksen International Ltd., 2 pages, prior to May 2000.

(Continued)

*Primary Examiner*—Rochelle-Ann J Blackman
(74) *Attorney, Agent, or Firm*—E. Richard Zamecki

(57) ABSTRACT

A light projector, including an elongate housing assembly and a tubular light chamber assembly that comprises a plurality of tubular components and is coaxially enclosed by the housing assembly, with optical devices positioned within the light chamber assembly.

33 Claims, 12 Drawing Sheets

U.S. PATENT DOCUMENTS

| | | | |
|---|---|---|---|
| 6,048,081 | A | 4/2000 | Richardson ................. 362/307 |
| 6,089,732 | A | 7/2000 | Wright et al. ............... 362/364 |
| 6,092,914 | A | 7/2000 | Esakoff et al. ............. 362/268 |
| 6,206,544 | B1 | 3/2001 | Costa ......................... 362/242 |
| 6,241,366 | B1 | 6/2001 | Roman et al. ............... 362/293 |
| 6,244,730 | B1 | 6/2001 | Goldberg et al. ............ 362/268 |
| 6,832,845 | B1 | 12/2004 | Kretzschmar et al. ....... 362/277 |
| 2005/0254246 | A1* | 11/2005 | Huang ........................ 362/362 |

FOREIGN PATENT DOCUMENTS

GB           2265976 A     10/1993

OTHER PUBLICATIONS

"Wendelighting Model 2350 Optical Projector Track Lighting System" flier of Wendelighting Division of Jacksen International Ltd., 2 pages, prior to May 2000.

"Wendelighting Model 4100 Low-voltage Single Lens Floodlight" flier of Wendelighting Division of Jacksen International Ltd., 1 page, prior to May 2000.

"Wendelighting Fixture Can Accessories" bi-fold flier of Wendelighting Division of Jacksen International Ltd., 4 pages, prior to May 2000.

"Wendelighting Installation Instructions for Recessed Optical Projects" booklet of Wendelighting Division of Jacksen International Ltd., 21 pages, prior to May 2000.

"Wendelighting® Recessed Optical Contour Projectors Models 1776 and 2346" tri-fold flier of Wendelighting® Division of Jacksen International Ltd., 6 pages, prior to May 2000.

"Wendelighting Model 2346 Recessed Optical Projectors" flier of Wendelighting Division of Jacksen International Ltd., 2 pages, prior to May 2000.

"Wendelighting Model 2345 Optical Projectors" flier of Wendelighting Division of Jacksen International Ltd., 2 pages, prior to May 2000.

"Selecon architectural display lighting" brochure of Selecon New Zealand Ltd., Auckland, New Zealand, 16 pages including the front cover and the back cover, no discernable date of publication.

"Selecon Architectural Products The Accent range The Solon Recessed Mounting" promotional page obtained from the Selecon Internet Site Sep. 10, 2001.

"Accent spot" and "solon recessed mounting" 2 specification pages obtained from the Selecon Internet site Sep. 10, 2001, with a reference to Apr. 1997.

"Selecon Architectural Products The Accent range The Accent Profile" promotional page obtained from the Selecon Internet site Sep. 10, 2001.

"Accent profile" 2 specifiction pages obtained from the Selecon Internet site Sep. 10, 2001, with a reference to Apr. 1997.

\* cited by examiner

LIGHT PROJECTOR

BACKGROUND OF THE INVENTION

1. Field of the Invention

The present invention relates to light projectors that produce light beams for specialty lighting effects. More particularly, the present invention pertains to light projectors that can produce light beams of selected cross-sectional contours, or profiles.

2. Description of Related Art

Specialty light projectors are known for use in illuminating objects and scenes. Such light projectors may be used in lighting landscape features, architectural features, items displayed in cabinets or the like, art works, including pictures and sculpture, and scenes on a theatrical stage. Various techniques may be employed to affect a projected light beam, selectively blocking, or masking, a portion of the beam, to produce a desired cross-sectional beam contour.

U.S. Pat. No. 6,832,845, wherein one of the present inventors is identified as a co-inventor, discloses a light projector that includes an optical bench mounted within a housing assembly and comprising an elongate base. One or more clamps are attached to the base to hold optical devices such as a lamp and a condensing lens. Several masking devices are shown to be usable with the disclosed light projector, including an array of shutter blades having concave light beam profiling edges, a thin metal plate with one or more openings cut to determine a contour for a light beam, and a glass plate on which photosensitized tape is used to produce one or more openings to determine a contour for a light beam.

It is advantageous and desirable to provide a contour light projector of improved construction wherein optical devices are held in place within a tubular light chamber which is anchored within a housing assembly.

SUMMARY OF THE INVENTION

The present invention provides a light projector including an elongate housing assembly and a tubular light chamber assembly that comprises tubular components and is coaxially enclosed by the housing assembly. Optical devices, such as one or more condensing lenses, a lamp and a transverse wall broken by an aperture, are held in place, at least in part, within and by components of the light chamber assembly. The housing assembly may comprise a generally cylindrical main housing body, an end cap at the back end of the housing assembly and a focus cone at the front end of the housing assembly. The light chamber assembly may comprise a generally tubular lens holder having internal annular shoulders and located toward the front end of the light chamber assembly, and a lamp tube toward the back end of the light chamber, with a generally annular lamp tube plate receiving the back end of the lamp tube and locking to the back end of the main housing body, and a lamp clamp plate that latches to the lamp tube plate. An aperture cup, comprising a cylindrical body with a transverse back wall having an aperture, is positioned within the lens holder, and holds a first condensing lens in place against an annular shoulder within the lens holder. A lock plate is held against the front end of the main housing body and the front end of the lens holder by the back end of the focus cone, and holds a second condensing lens in place against an annular shoulder within the lens holder. A lamp is held in place at the back end of the main housing body, at least in part, by the lamp clamp plate. The focus cone comprises a reduction cone and a lens sleeve selectively positioned to extend the front of the focus cone, and which carries two projection lenses that are selectively longitudinally spaced apart. Multiple holes and insets provide ventilation passages from the interior of the light chamber assembly through the region between the light chamber assembly and the interior surface of the housing assembly enclosing the light chamber assembly to the exterior of the light projector. A light beam contour masking device may be held between the back end of the focus cone and the lock plate. The lamp may be a focusing lamp comprising an ellipsoidal reflector with a light source at a first focal point of the ellipsoid, toward the reflector, and a second focal point coincident with the aperture. An alternate embodiment provides a light source at the aperture rather than a lamp as described above.

BRIEF DESCRIPTION OF THE DRAWINGS

These and other features, aspects, and advantages of the present invention will become more fully apparent from the following description, appended claims, and accompanying drawings in which:

DETAILED DESCRIPTION OF PREFERRED EMBODIMENT

Figure 1:
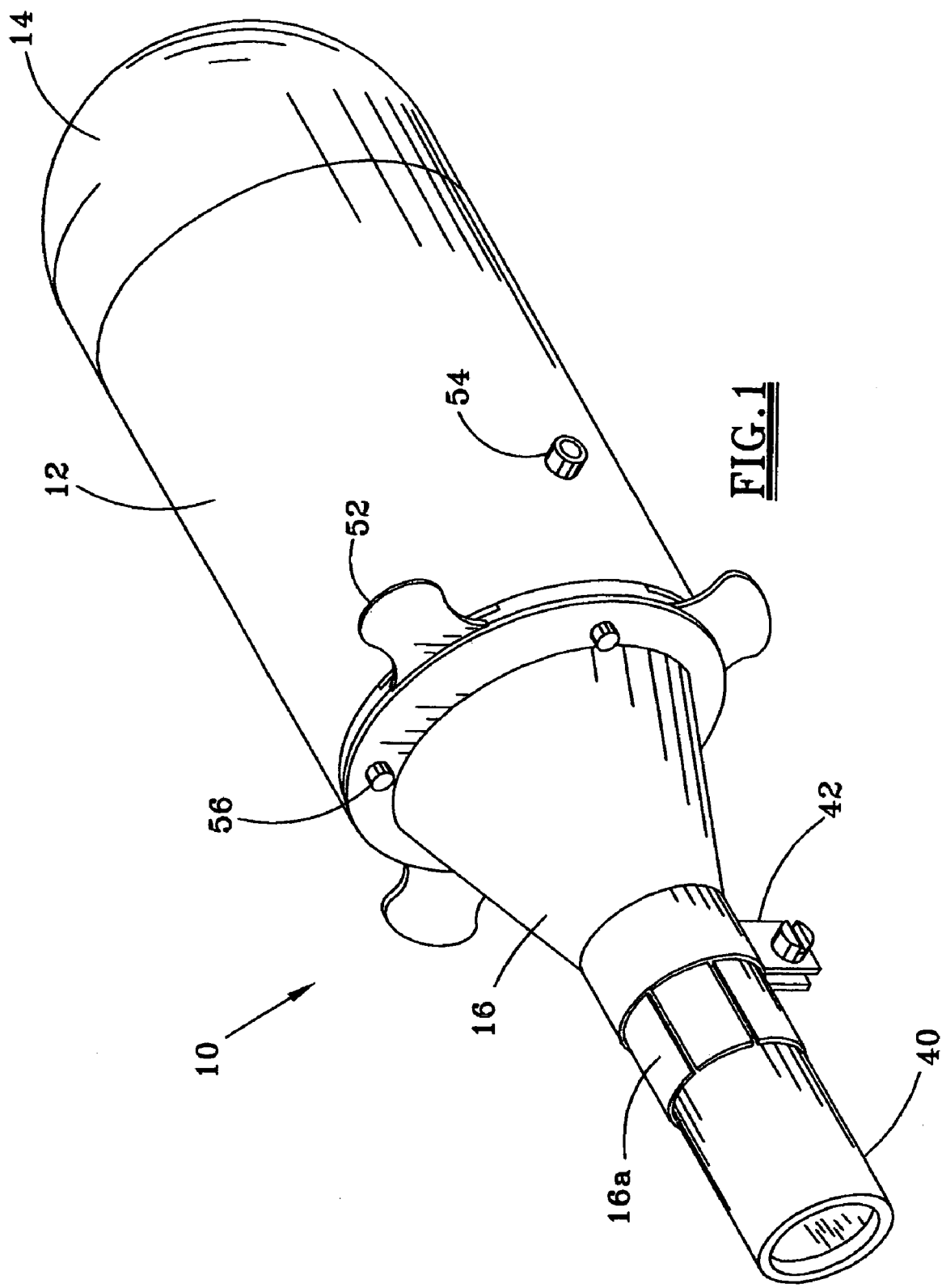
FIG. 1 is an isometric view of a light projector according to the present invention.
Figure 2:
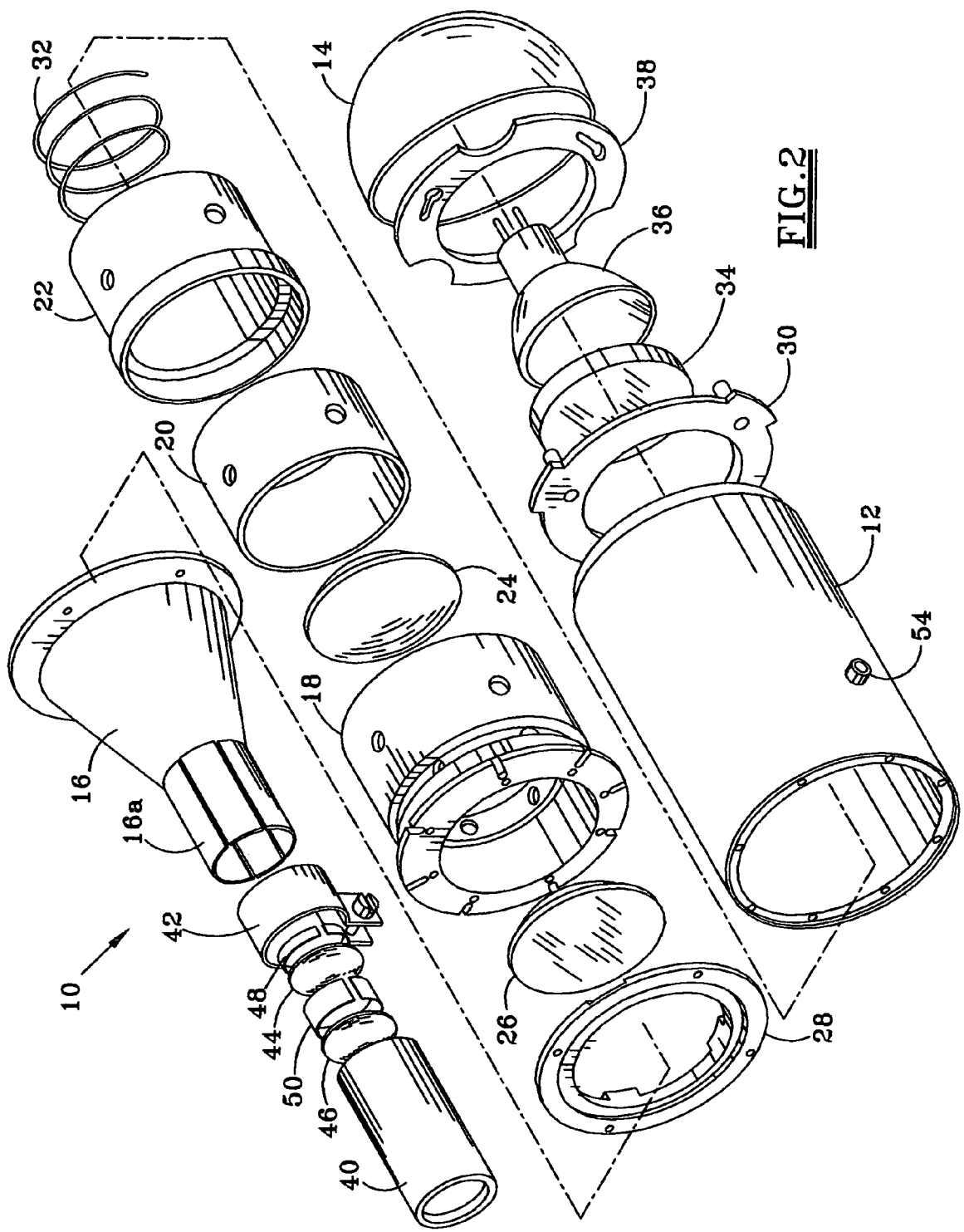
FIG. 2 is an exploded isometric view of the light projector.
Figure 3:
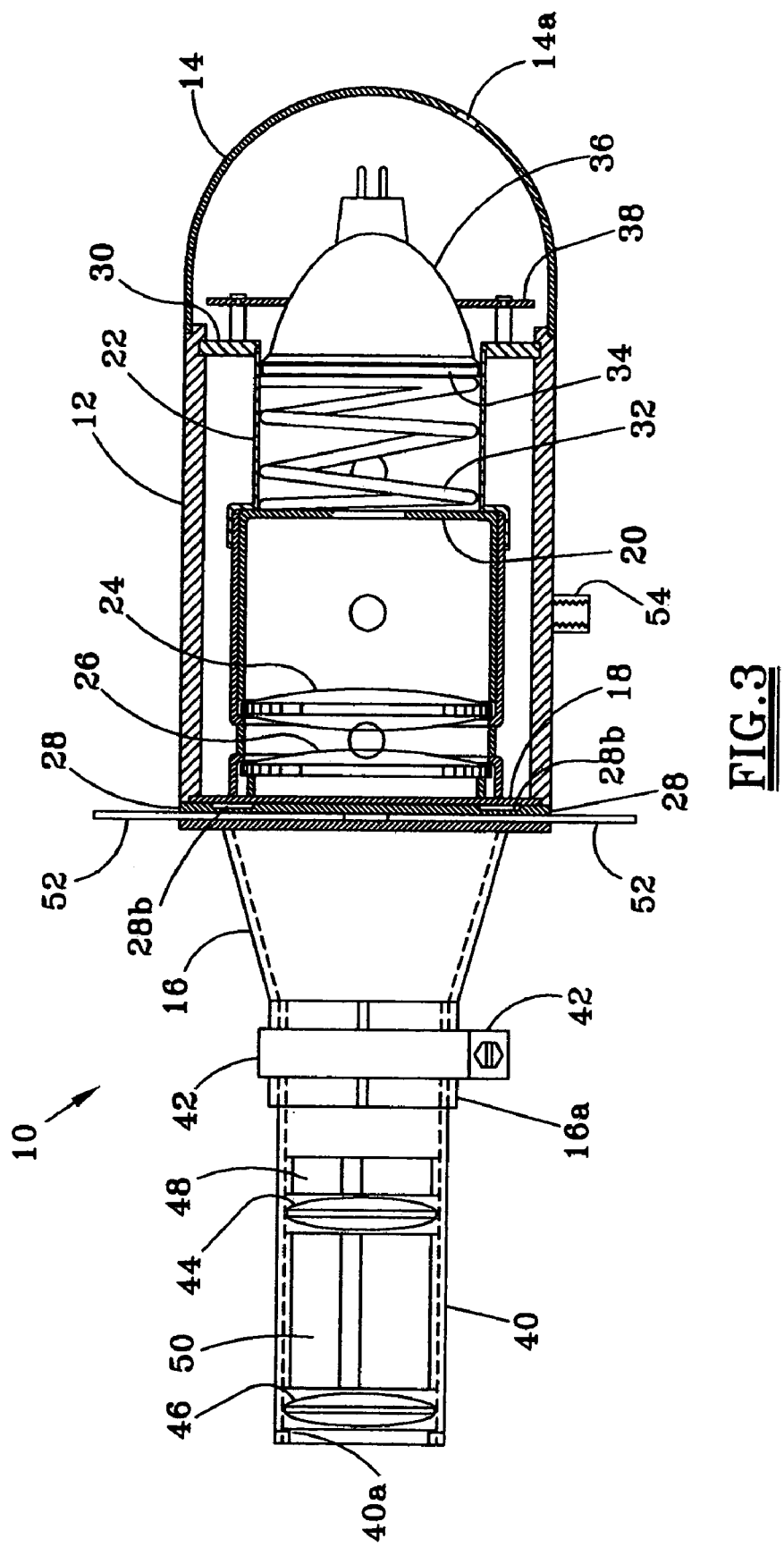
FIG. 3 is a side elevation in partial cross section of the light projector.

A light projector according to the present invention is shown generally at 10 in FIGS. 1-3. The projector 10 comprises an elongate housing assembly including a generally cylindrical main housing body 12, an end cap 14 and a focus cone 16. The projector 10 is considered to have a back end, where the end cap 14 is located, and a front end, where the focus cone 16 is located. Likewise, the various parts of the light projector 10 may be described as having front ends and back ends consistent with the directions toward the corresponding ends of the light projector as a whole.

The housing assembly is positioned coaxially around a tubular light chamber assembly within which optical devices are mounted. The light chamber assembly comprises a lens cradle assembly, including a lens holder 18, within which an aperture cup 20 is positioned, and a lamp tube 22. The lens cradle assembly positions two condensing lenses within the light projector 10: a first, double convex lens 24 and a second, plano-convex lens 26. As seen in FIG. 3, the two lenses 24 and 26 are located within the lens holder 18, with the first lens 24 fixed in place by the front edge of the aperture cup 20, and the second lens 26 held in place by a lock plate, or holding ring, 28. The back end of the focus cone 16 is secured to the lock plate 28, the front end of the lens holder 18 and the front end of the main housing body 12.

A lamp tube plate 30 receives the back end of the lamp tube 22 and is locked to the back end of the main housing body 12. A coil spring spacer 32 is positioned within the lamp tube 22 and against the back surface of the aperture cup 20. A filter 34 is positioned against the opposite end of the spring 32, and is sandwiched against the face of a lamp 36. The filter 34 may be any desired filter, such as a color filter, including an ultraviolet filter. A lamp clamp plate 38 is locked down on the lamp tube plate 30, compressing the spring 32 between the aperture cup 20 and the filter 34 and securing the filter and the lamp 36 in place. The compressed spring 32 holds the filter 34 against the front of the lamp 36 and the lamp against the lamp clamp plate 38. The end cap 14 is friction fit onto, and closes off, the back end of the main housing body 12. An aperture 14a in the cap 14 (FIG. 3) allows passage of electrical leads (not shown) from the lamp 36 through the cap to an electrical power source and switch (not shown) for selective operation of the lamp.

At the front end of the focus cone 16, multiple leaves 16a form an extension that receives a lens sleeve 40 as part of the focus cone. A clamp 42 is tightened with a screw around the leaves 16a to hold the lens sleeve 40 in place relative to the remainder of the focus cone 16. Within the lens sleeve 40 are two projection lenses 44 and 46, held in place against a front, inner lip 40a (FIG. 3) of the lens sleeve by two split ring spacers 48 and 50. The width of the spacer 50 may be selected to achieve desired spacing between the two lenses 44 and 46, while the position of the lens sleeve 40 relative to the remainder of the focus cone 16 is also selectively adjustable to change the focus of the light projector 10.

A masking device is positioned between the focus cone 16 and the front side of the lock plate 28. In the illustrated embodiment, the mask is in the form of four shutter mask blades 52 (three visible in FIG. 1 and two visible in FIG. 3). Other forms of masks may be used with the light projector 10, as discussed more fully below.

Details of the various parts of the light projector 10 may be more fully appreciated by reference to FIGS. 4-23. Details of the main housing body 12 may be appreciated by reference to FIGS. 4-6. Three threaded mounting holes 54 are distributed around the periphery of the main housing body 12 to receive bolts or the like from a mounting assembly (not shown), for example, by which the light projector 10 may be mounted. Such a mounting assembly is disclosed in U.S. Pat. No. 6,832,845, but other mounting apparatus may be employed with the light projector 10.

Figure 4:
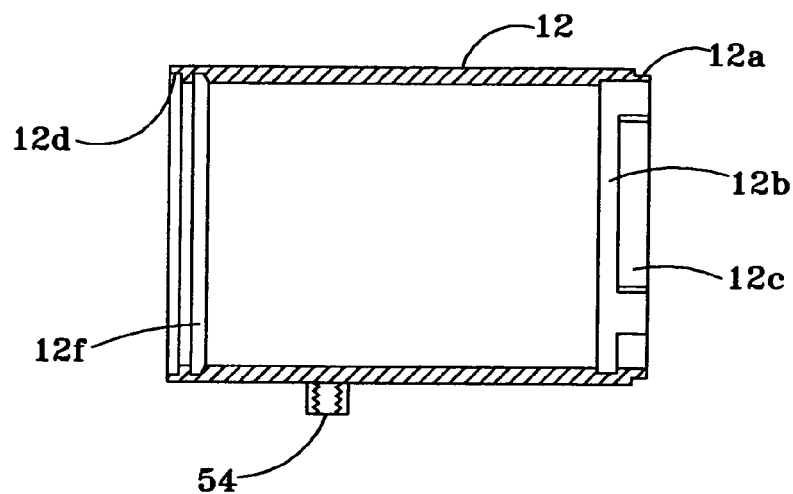
FIG. 4 is a side elevation in cross section of the main housing body of the housing assembly of the light projector.
Figures 5, 6:
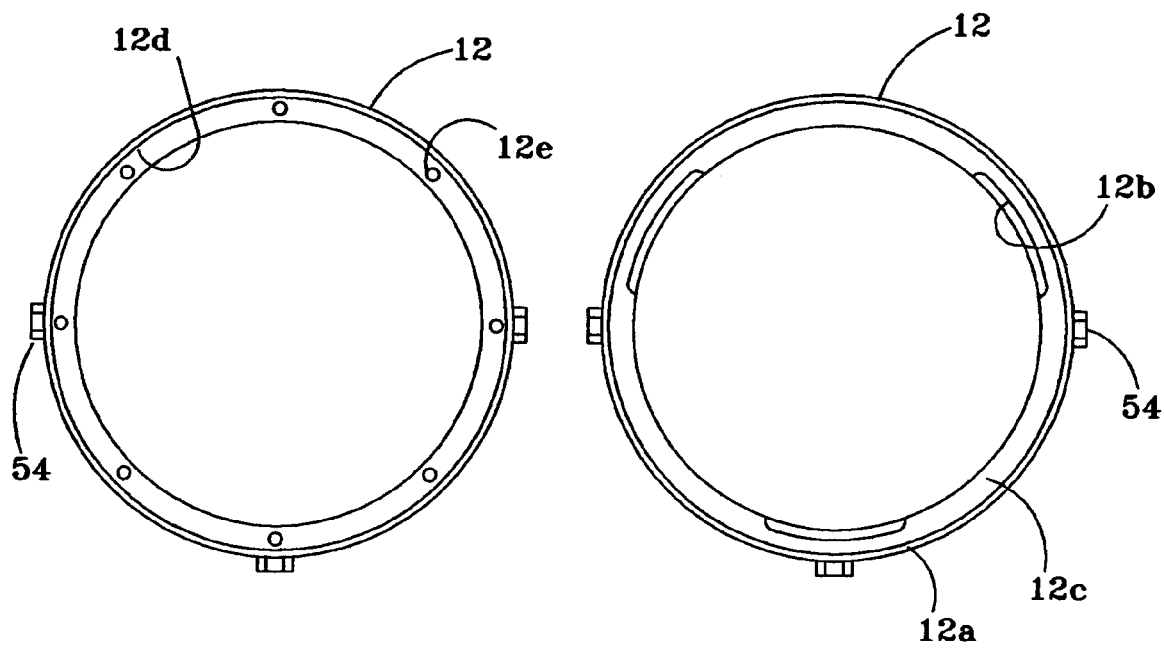
FIG. 5 is a back end elevation of the main housing body.
FIG. 6 is a front end elevation of the main housing body.

As shown in FIGS. 4 and 5, the back end of the main housing body 12 has an external offset 12a to form a narrow lip to receive the end of the cap 14 in a friction fit, with the leading edge of the cap seating against the exterior shoulder formed by the offset (see FIG. 3). An annular interior groove 12b is axially covered, in part, by three internally facing lugs 12c that are mutually spaced apart about the internal circumference of the main housing body 12. The interior lugs 12c are used to capture and hold the lamp tube plate 30, as discussed below.

As shown in FIGS. 4 and 6, the front end of the main housing body 12 has an internal offset 12d to receive the front end of the lens holder 18 as discussed below. Eight longitudinally extending threaded holes 12e (FIG. 6) are arrayed around the annular shoulder formed by the offset 12d to receive bolts as discussed below. An internal groove 12f (FIG. 4) is cut to facilitate the threading of the holes 12e.

Figure 7:
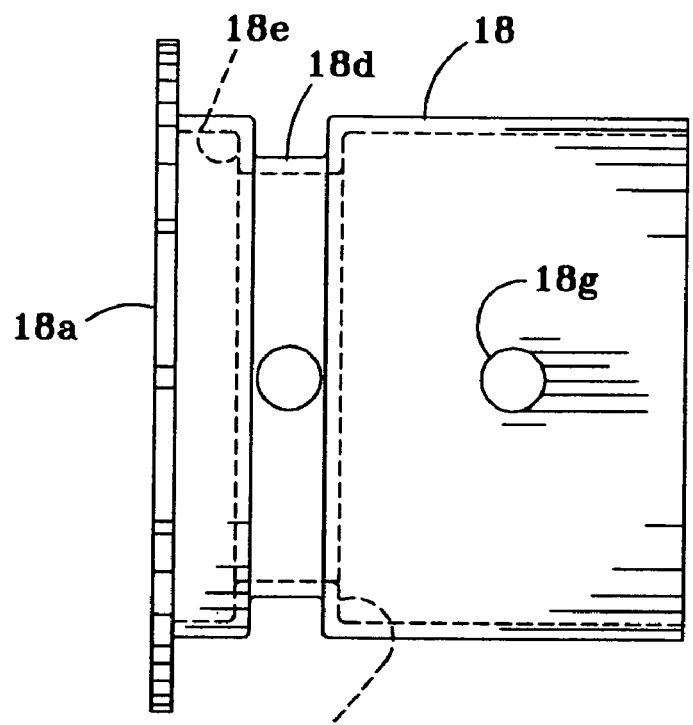
FIG. 7 is a side elevation of the lens holder of the lens cradle assembly of the light projector.
Figure 8:
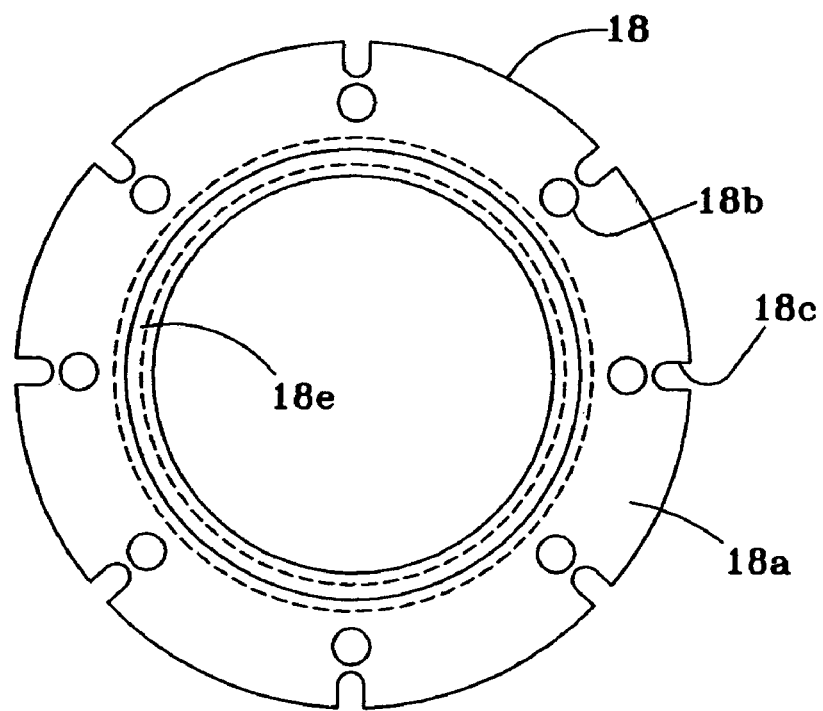
FIG. 8 is a front end elevation of the lens holder of the lens cradle assembly.

Details of the lens holder 18 of the lens cradle assembly may be appreciated by reference to FIGS. 7 and 8. The lens holder 18 is tubular, and features a flat flange 18a at the forward end. Eight ventilation holes 18b and eight slots 18c are arrayed around the flange 18a as shown in FIG. 8. The ventilation holes 18b facilitate temperature equalization to avoid lens fogging, as discussed below. The slots 18c allow passage of bolts through the flange 18a and into the threaded holes 12e of the main housing body 12.

The generally cylindrical body of the lens holder 18 is broken by an annular indentation 18d that forms an annular, forward-facing interior shoulder 18e and an annular, backward-facing interior shoulder 18f. The forward-looking shoulder 18e receives the back, convex face of the plano-convex lens 26, as shown in FIG. 3. The backward-facing shoulder 18f receives the front face of the double convex lens 24, as also shown in FIG. 3. Eight ventilation holes 18g are arrayed in two rows around the lens holder 18 to assist in venting heat that enters the lens cradle assembly from the lamp 36.

Figures 9, 10:
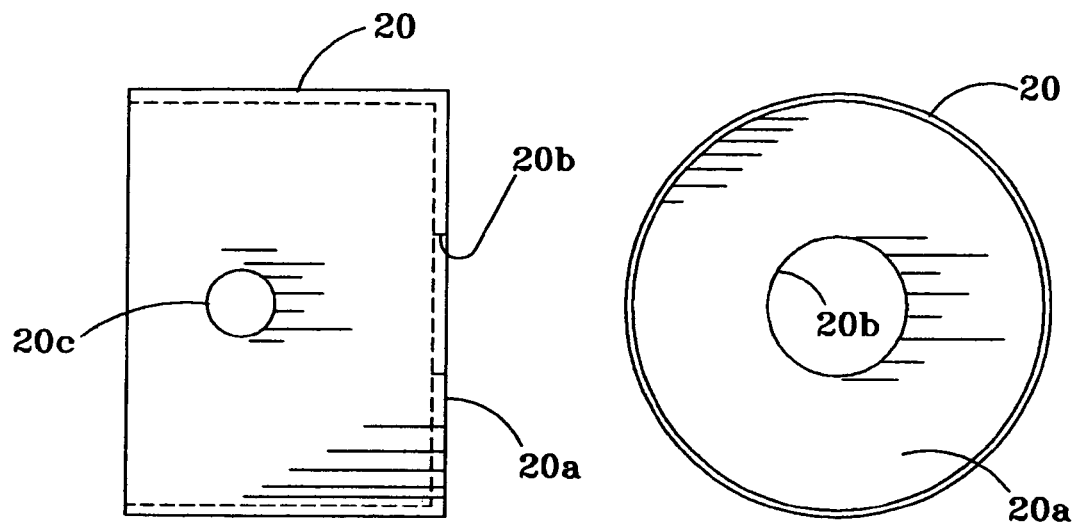
FIG. 9 is a side elevation of the aperture cup of the lens cradle assembly.
FIG. 10 is a front end elevation of the aperture cup of the lens cradle assembly.

Details of the aperture cup 20 of the lens cradle assembly may be appreciated by reference to FIGS. 9 and 10. The aperture cup 20 comprises a cylinder that is closed off at its back end with a transverse wall 20a. A centrally located circular aperture 20b breaks the wall 20a and is positioned coaxially with the assembled light chamber assembly. Four ventilation holes 20c are arrayed around the cylindrical portion of the aperture cup 20.

Figures 11, 12:
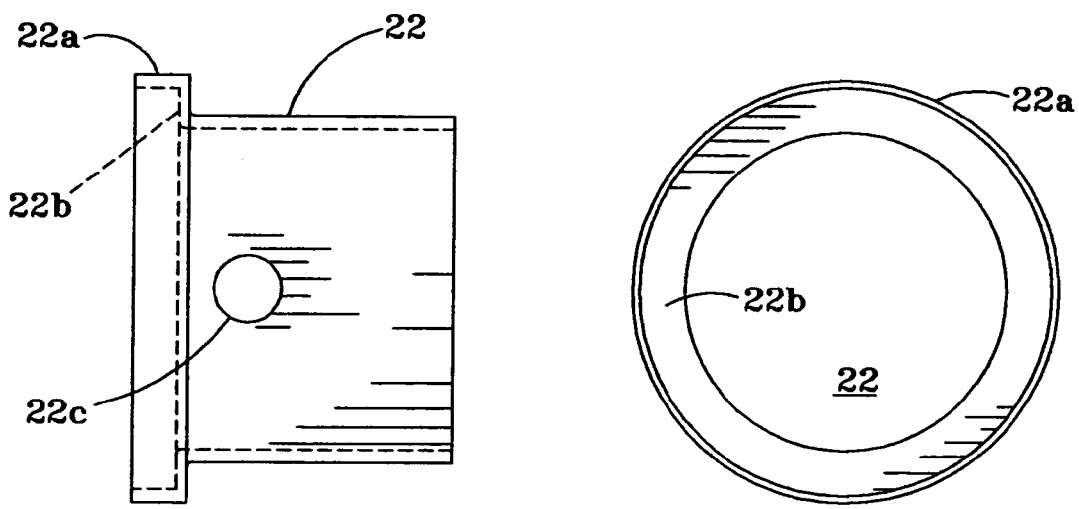
FIG. 11 is a side elevation of the lamp tube of the lens cradle assembly.
FIG. 12 is a front end elevation of the lamp tube of the lens cradle assembly.

Details of the lamp tube 22 of the lens cradle assembly may be appreciated by reference to FIGS. 11 and 12. The lamp tube 22 is tubular and features an offset forward end 22a that forms an annular, forward-facing interior shoulder 22b. Four ventilation holes 22c are arrayed around the lamp tube 22.

Figure 13:
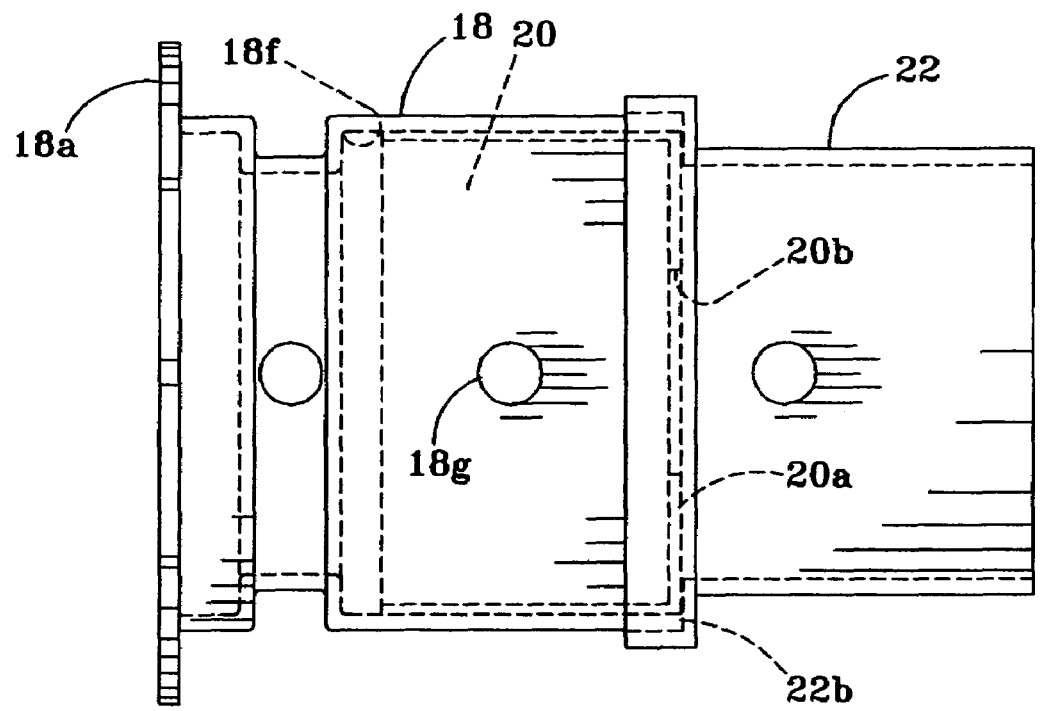
FIG. 13 is a side elevation of the lens cradle assembly made up of the lens holder, aperture cup and lamp tube.
Figure 14:
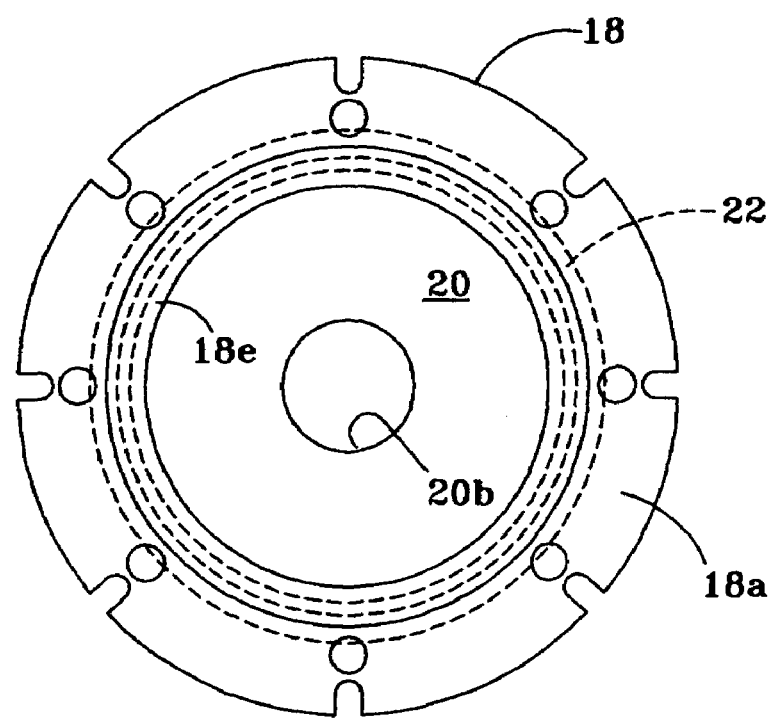
FIG. 14 is a front end elevation of the lens cradle assembly as shown in FIG. 13.

FIGS. 13 and 14 show the lens holder 18, the aperture cup 20 and the lamp tube 22 joined together as the lens cradle assembly. The aperture cup 20 is placed within the lens holder 18 with the transverse back wall 20a of the aperture cup even with the back edge of the lens holder, leaving a gap between the backward-facing shoulder 18f of the lens holder and the leading edge of the aperture cup. The double convex lens 24 is held in the gap between the shoulder 18f and the edge of the aperture cup 20, as shown in FIG. 3. The ventilation holes 20c of the aperture cup 20 are aligned with respective ventilation holes 18g on the wider cylindrical portion of the lens holder 18. The offset end 22a of the lamp tube 22 is placed over the back end of the aperture cup 20 and the lens holder 18. The resulting lens cradle assembly provides a tubular structure that holds the two condensing lenses 24 and 26 in selected, longitudinally spaced relationships with each other and with the aperture 20b, and further, as discussed below, with the lamp 16.

Figures 15, 16:
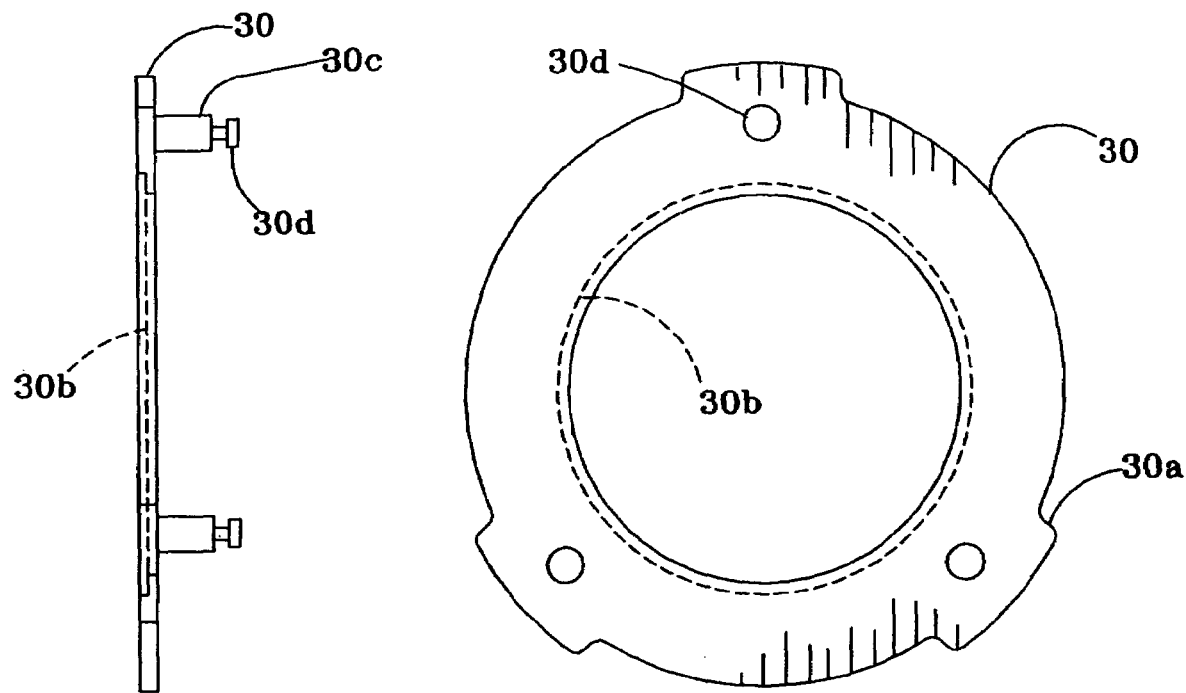
FIG. 15 is a back end elevation of the lamp tube plate of the light projector.
FIG. 16 is a side elevation of the lamp tube plate.

Details of the lamp tube plate 30 may be appreciated by reference to FIGS. 15 and 16. The lamp tube plate 30 comprises a generally flat ring. The lamp tube plate 30 features three outwardly extending lugs 30a that are mutually spaced apart around the outer edge of the lamp tube plate. The lugs 30a are used to lock the lamp tube plate 30 to the main housing body 12. An annular recess 30b on the forward side of the lamp tube plate 30 surrounds the opening through the lamp tube plate to receive the back edge of the lamp tube 22. Three posts 30c, with grooves and post caps 30d, are positioned on the back of the lamp tube plate 30 to receive and lock the lamp clamp plate 38.

Figure 17:
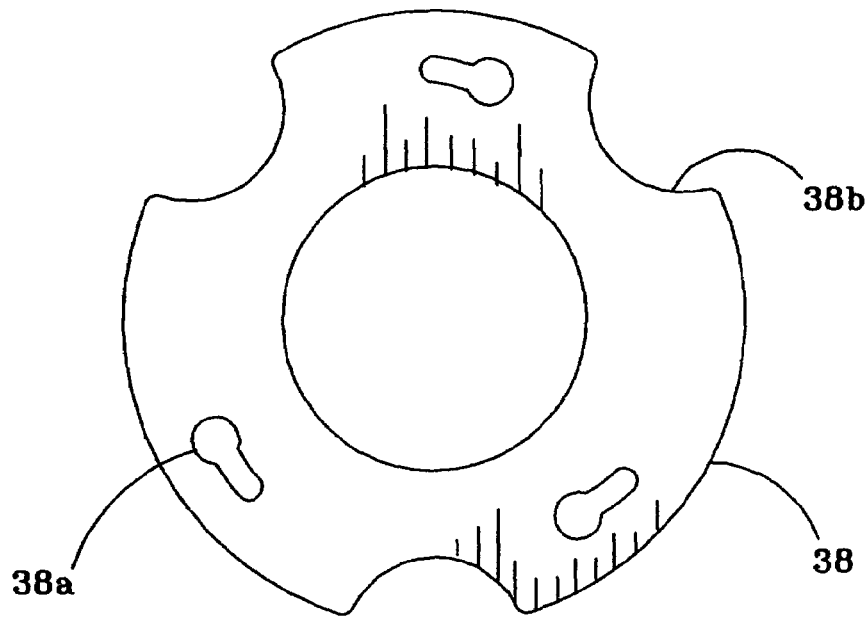
FIG. 17 is an end elevation of the lamp clamp plate of the light projector.

Details of the lamp clamp plate 38 may be appreciated by reference to FIG. 17. The lamp clamp plate 38 comprises a generally flat ring. Three structured holes 38a are mutually spaced apart around the lamp clamp plate 38, and may be aligned with the posts 30c of the lamp tube plate 30. Each structured hole 38a resembles a keyhole, including a generally circular portion and a narrower neck portion as shown. Three round cutouts 38b are arrayed around the edge of the lamp clamp plate 38 to serve as "finger holes" to facilitate assembly of the light projector 10.

Figure 18:
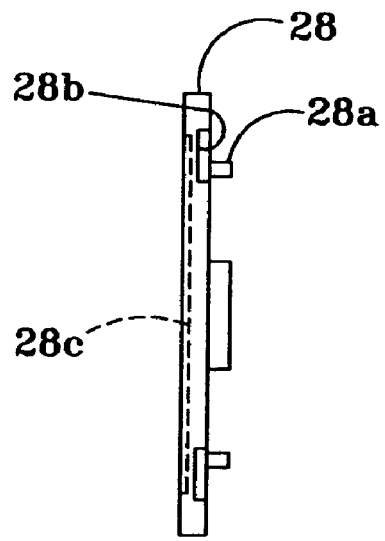
FIG. 18 is a side elevation of the lock plate of the light projector.
Figure 19:
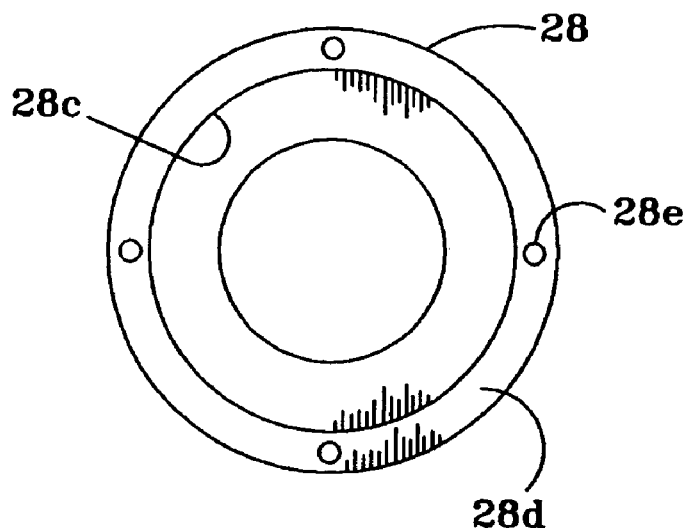
FIG. 19 is a front end elevation of the lock plate.
Figure 20:
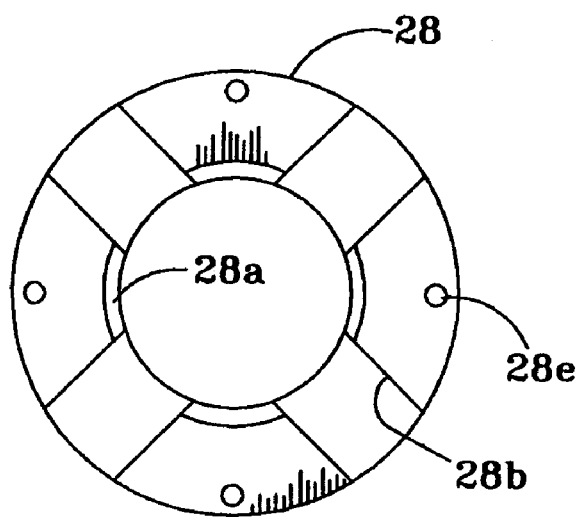
FIG. 20 is a back end elevation of the lock plate.

Details of the lock plate 28 may be appreciated by reference to FIGS. 18-20. The lock plate 28 comprises a structured ring having four arc-shaped, elongate tabs 28a extending backwardly around the central opening through the lock plate. Four insets 28b in the back surface of the lock plate 28 are positioned between adjacent tabs 28a, and extend from the central opening to the outer edge of the lock plate. An annular inset 28c on the front surface of the lock plate 28 leaves an outer annular ridge 28d where four holes 28e are arranged to accommodate bolts as discussed below.

Figure 21:
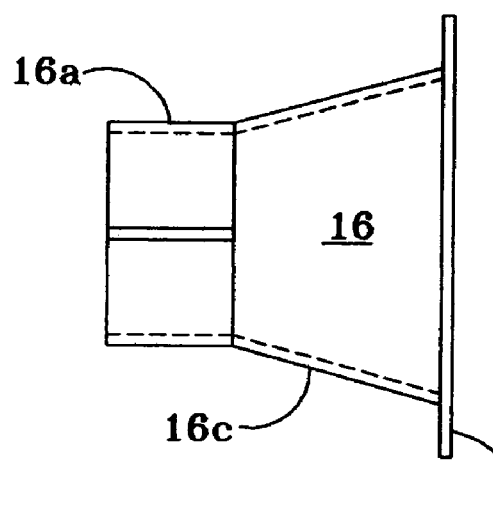
FIG. 21 is a side elevation of the focus cone of the light projector.
Figure 22:
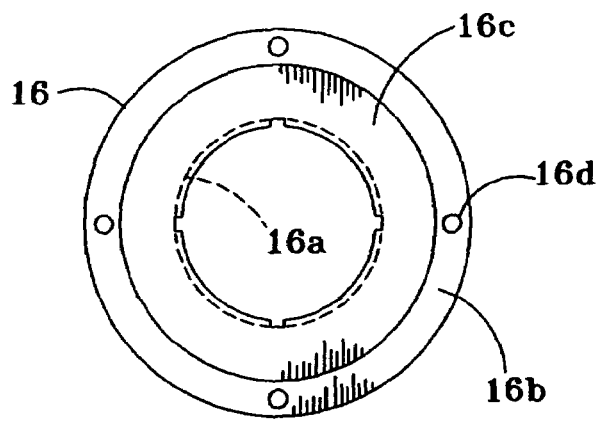
FIG. 22 is a back end elevation of the focus cone.

Further details of the focus cone 16 may be appreciated by reference to FIGS. 21 and 22. The focus cone 16 includes an annular flange 16b that is joined to the extension leaves 16a by a reducing cone 16c. The flange 16b has four holes 16d arranged to receive bolts as discussed below.

The light projector 10 may be assembled as follows. The double convex condensing lens 24 is positioned within the lens holder 18 against the backward-facing shoulder 18f. The aperture cup 20 is then positioned within the lens holder 18 with the leading edge of the aperture cup engaging the lens 24 and holding it in place. The back of the aperture cup 20 is then at the back edge of the lens holder 18. The lamp tube 22 is positioned on the back end of the lens holder 18 to complete the formation of the lens cradle assembly. The lens cradle assembly is placed within the main housing body 12 from the front thereof, with the flange 18a of the lens holder 18 received within the internal offset 12d of the main housing body. The lens cradle assembly is oriented so that the eight slots 18c of the lens holder 18 are aligned with the eight threaded holes 12e at the front end of the main housing body 12. Four flat head bolts (not shown) are introduced through four equally spaced apart lens holder flange slots 18c and threaded into four of the main housing body threaded holes 12e to lock the lens holder 18 to the front end of the main housing body 12.

The lamp tube plate 30 is placed within the back end of the main housing body 12 by passing the lugs 30a of the lamp tube plate through spaces between adjacent main housing body lugs 12c to the interior groove 12b of the main housing body. The back edge of the lamp tube 22 is received within the recess 30b of the lamp tube plate 30. The lamp tube plate 30 is rotated to pass the lamp tube plate lugs 30a in the groove 12b to positions under the main housing body lugs 12c to lock the lamp tube plate against longitudinal movement relative to the main housing body 12. Thus, the lens holder 18, the aperture cup 20, the condensing lens 24, the lamp tube 22 and the lamp tube plate 30 are positioned within the main housing body 12 and locked therein at both ends of the main housing body.

The coil spring spacer 32 is inserted through the lamp tube plate 30 into the lamp tube 22. The filter 34 is pressed against the spring 32 and the front of the lamp 36 is placed against the filter. The lamp clamp plate 38 is then placed over the back of the lamp 36, with the lamp protruding backwardly through the annular opening of the lamp clamp plate. The lamp clamp plate 38 is pressed against the lamp 36 to compress the spring 32 within the lamp tube 22 until the circular portions of the structured holes 38a in the lamp clamp plate pass over corresponding posts 30c on the back of the lamp tube plate 30. The lamp clamp plate 38 is then rotated slightly to bring the narrow necks of the holes 38a under the post caps 30d on the lamp tube plate posts 30c, locking the lamp tube plate 38 to the lamp tube plate 30. The lamp 36 and the filter 34 are thus locked down on the compressed spring 32. The end cap 14 may then be placed over the back end of the main housing body 12, being received by the main housing body external offset 12a and held there by friction. As noted above, wiring from a power source to the lamp 36 may be passed through the end cap aperture 14a, which may be lined with a grommet or the like (not shown) to protect the insulation on the wiring.

At the front end of the main housing body 12 the plano-convex lens 26 is inserted into the lens holder 18 with the convex side of the lens placed against the lens holder shoulder 18e. The lock plate 28 is then place against the lens holder flange 18a, bringing the lock plate tabs 28a against the flat side of the lens 26. The lock plate 28 is oriented so that the four holes 28e are aligned with the four lens holder slots 18c that have not received flat head bolts (not shown) as described above. Then, the four insets 28b in the back surface of the lock plate 28 are positioned to receive the flat heads of the bolts already in place in lens holder slots 18c. The annular flange 16b of the focus cone 16 is positioned opposite the front of the lock plate 28 with a masking device being held in place between the focus cone flange and the lock plate. The four holes 16d of the focus cone flange 16b are aligned with the four holes 28e of the lock plate 28. Four bolts 56 (FIG. 1) are inserted through the focus cone holes 16d, the lock plate holes 28e and the four empty lens holder slots 18c and threaded into the remaining four vacant main housing body holes 12e. Thus, the focus cone 16 and the lock plate 28 are locked to the front end of the main housing body 12, securing the lens 26 in place. Likewise, the masking device between the focus cone flange 16b and the lock plate 28 is held in place. Positioning the lens sleeve 40 within the focus cone extension leaves 16a and tightening the clamp 42 completes the assembly of the light projector 10.

The light beam contour masking device included in the illustrated embodiment comprises four shutter mask blades 52, as indicated in FIGS. 1 and 3. Such a shutter blade 52 is further illustrated in FIG. 23. Each shutter blade 52 has a handle end which protrudes laterally from the assembled light projector 10 in FIGS. 1 and 3, and by which the position and orientation of the shutter blade may be selectively adjusted. The array of four shutter blades 52 is so adjusted to mask the light beam produced by the light projector 10 to the desired profile at the target, or object to be illuminated by the light projector. The positions of the shutter blades 52 are adjusted with the bolts 56 sufficiently loose, then the bolts are tightened to hold the blades in place and to tighten the locking of the focus cone 16 to the main housing body 12. The four flat head bolts (not shown) retain the lens holder 18 locked to the main housing body 12 as the bolts 56 are loosened, preventing the compressed spring 32 from driving the lens holder, lens tube 22, aperture cup 20 and condensing lenses 24 and 26 forward relative to the main housing body.

Figure 23:
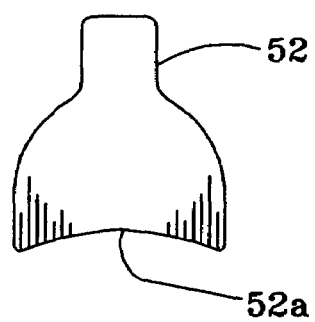
FIG. 23 is a side elevation of a shutter mask blade as included in FIGS. 1 and 3.

The leading edge 52a of the shutter mask blade 52 opposite its handle is illustrated in FIG. 23 as concave. The radius of curvature of the edge 52a may be selected as needed, as may the width of the shutter blade 52 itself. The width of the shutter blades 52 may be varied as needed to achieve the size of the profile image at the location to be illuminated, for example. However, the larger the cross-sectional areas of the focal lenses 44 and 46 used in producing the projected light beam, the greater the tendency to produce pincushion distortion. Such distortion can be overcome by decreasing the radius of curvature of the shutter blade edges 52a, that is, by curving these edges to a greater extent, a straight edge having a radius of curvature of infinity. The central opening through the lock plate 28 should not be made too large in comparison to the widths of the shutter mask blades 52 to avoid stray light passing around the shutter mask blades and through the lock ring opening.

Other types of light beam contour masking devices may be used with the light projector 10. U.S. Pat. No. 6,832,845 discusses use of plate masks, for example. These masks include a custom plate mask comprising a generally rectangular thin metal sheet with one or more apertures to selectively shape the profile of one or more light beams emerging from the light projector. Also, a glass slide photo mask is disclosed in U.S. Pat. No. 6,832,845 to include a generally rectangular thin glass plate carrying a photosensitive tape that is exposed to photograph an image. The image is used to determine the removal of one or more portions of the exposed photo tape to produce a mask that is then used to effect the desired light beam profile emerging from the light projector.

Figure 24:
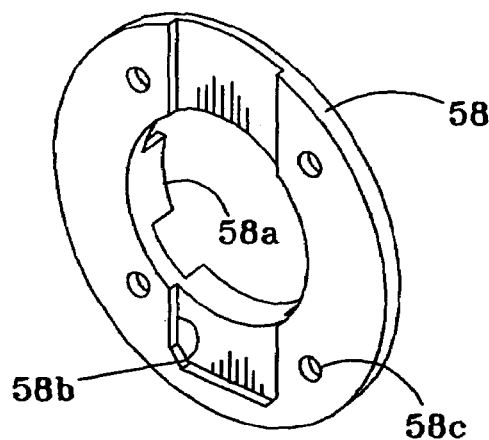
FIG. 24 is an isometric view of another version of a shutter lock late to accommodate other types of masking devices.

The four shutter mask blades 52 are held between the back surface of the focus cone flange 16b and the annular ridge 28d of the lock plate 28. Different masks may require modified lock plates in place of the lock plate 28 used with the shutter mask blades 52. FIG. 24 illustrates a lock plate, or ring, 58 that accommodates plate masks, for example, and is similar to those described in U.S. Pat. No. 6,832,845. The lock plate 58 comprises an annular ring having a structured back surface like that of the back surface of the lock plate 28 as shown in FIGS. 18 and 20. The back of the lock plate 58 has four arc-shaped elongate tabs 58a as well as four insets between adjacent tabs. The front side of the lock plate 58 features a structure 58b in the form of an extended rectangular inset that spans the annular opening through the lock ring. The lock plate 58 is positioned between the end of the main housing body 12 and the focus cone flange 16b with the tabs 58a against the plane front of the lens 26. The bolts 56 are used to lock these parts together, passing through holes 58c in the lock plate 58. A plate mask (not shown) can then be slid into the insert 58b without loosening the bolts 56 as is done to position shutter mask blades as discussed above. Thus, such plate masks may be changed at will, and there is no need to lock the lens holder 18 to the main housing body 12 with flat head bolts to prevent the compressed spring 32 from dislodging the lens cradle assembly to adjust the masking device. The dimensions of the inset 58b, including depth and width, are determined by the size of the plate mask. The bottom corners of the inset 58b may be beveled as shown in FIG. 24 to receive matching bevels in the shape of the plate mask.

Figure 25:
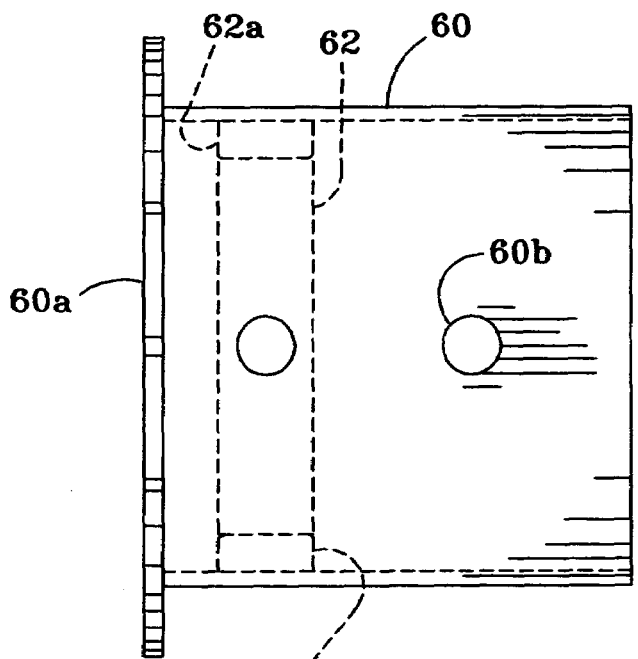
FIG. 25 is a side elevation of an alternate version of a lens holder.

FIG. 25 illustrates an alternate lens holder 60. The lens holder 60 is a straight bore cylindrical structure having a forward end flange 60a that is like the flange 18a of the lens holder 18. Vent holes 60b are arrayed around the lens holder 60. There is no indentation in the lens holder 60 like the indentation 18d of the lens holder 18. Instead, a ring spacer 62 is positioned within the lens holder 60 to receive the condensing lenses 24 and 26. The spacer 62 provides a forward-facing shoulder 62a to receive the condensing lens 26 and cooperate with the lock plate 28 or 58, for example, to hold the lens 26 in place. The spacer 62 also provides a backward-facing shoulder 62b to receive the condensing lens 24 and cooperate with the aperture cup 20 to hold the lens 24 in place. Use of the spacer 62 in the lens holder 60 has the advantage of not needing to form the indentation 18d, or any like structure, as included in the lens holder 18. The ring spacer 62 may be in the form of a split ring or the like, which would allow for not covering some lens holder vent holes 60b.

The lamp 36 may take any of several forms. As used herein, the term "lamp" refers to a combination including a light source and a reflector. In a preferred embodiment the lamp 36 is a focusing type lamp, that is, a lamp that focuses most of the emitted light at a point, or at least a small area. Focusing can be achieved with the combination of an ellipsoidal reflector and a small light source located at a first focal point of the ellipsoid defined by the reflector surface, that is, the focal point closer to the reflector surface. Then, most of the light from the lamp will be focused at the second focal point of the ellipsoid, which is farther removed from the reflector surface along the major axis of the ellipsoid. Because the light source will not be a true point source, but is rather extended over a small area, the light reaching the second focal point has a high intensity over a small region of space somewhat larger than the size of the light source. One such focusing lamp is the halogen lamp Ushio JCR12V-75W/FO of BLV Licht-und Vakuumtechnik GmbH, a company of the Ushio Group. Such a lamp is generally used to focus halogen light into fiber optic bundles, and includes a small filament, halogen light source, positioned in an ellipsoidal reflector substantially coincident with the first focal point of the reflector. Thus, most of the light emitted by the filament is collected and focused at the second focal point of the reflector, again with the high light intensity extended over a small region slightly larger than the size of the filament. Satisfactory projection results for a preferred embodiment may also be expected from a focusing high intensity discharge lamp using an ellipsoidal reflector. Again, the discharge light source is effected at the first focal point of the reflector to direct most of the emitted light to a small region at the second focal point of the reflector. The high intensity discharge lamp may provide higher overall light producing efficiency and increased longevity. Further, a preferred embodiment may employ a focusing lamp comprising one or more small light emitting diodes as a light source placed at the first focal point of an ellipsoidal reflector to focus the emitted light at the second focal point of the reflector. To maximize focusing the light at the second focal point, the one or more light emitting diodes might be placed to face backwards toward the reflector surface, thereby minimizing stray light directly from the light emitting diodes not being focused at the second focal point of the reflector. All three types of light sources are known in the art, and no further description of them is required here.

Figure 26:
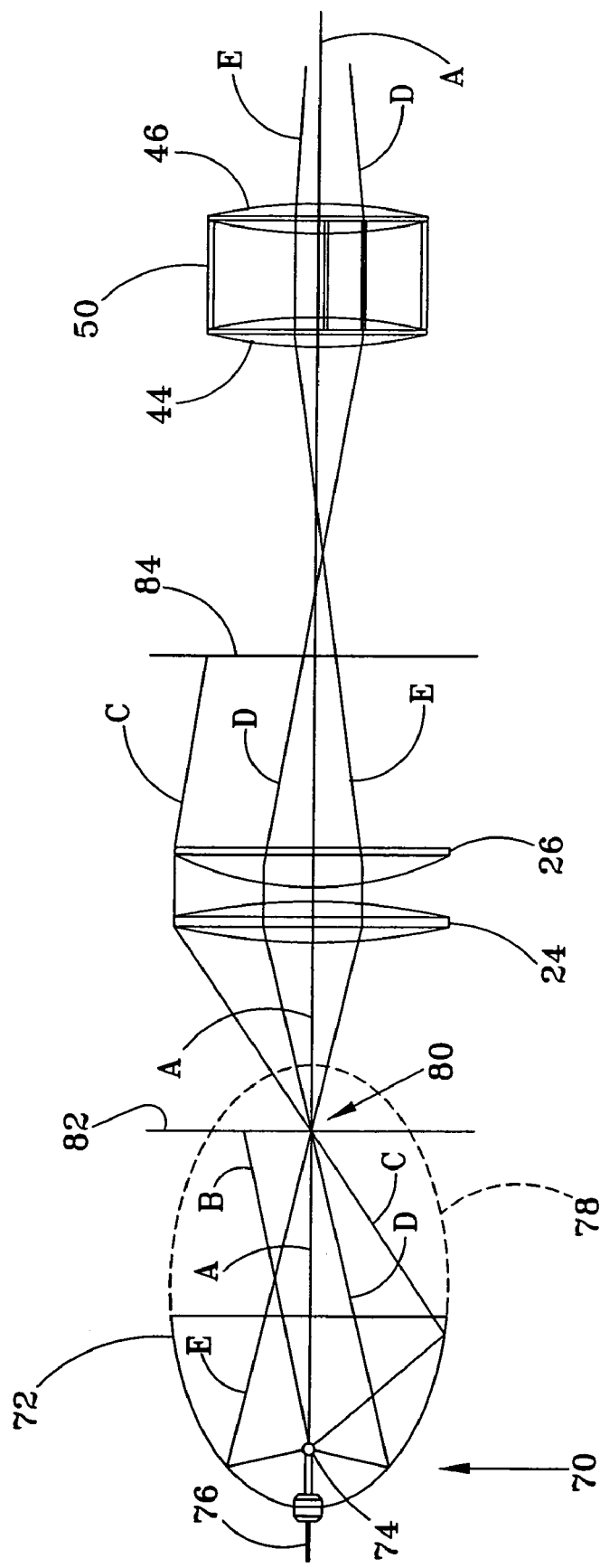
FIG. 26 is a schematic ray diagram illustrating operation of optical devices of the light projector employing a focusing lamp comprising an ellipsoidal reflector.

FIG. 26 provides a ray diagram of a preferred embodiment of the light projector of the present invention, utilizing a focusing lamp that is shown generally at 70. The lamp 70 comprises an ellipsoidal reflector 72, a light source 74 and appropriate electrical leads 76 for use in operating the light source. The schematically illustrated light source 74 is intended to represent any appropriate light source, such as the filament, discharge or light emitting diode(s) discussed above. The surface of the reflector 72 provides part of an ellipsoid 78 the remainder of which is indicated in dashed line. The ellipsoid 78 is a prolate ellipsoid, that is, the axis of rotational symmetry of the ellipsoid is the ellipsoid's major axis, and in this case that major axis lies along the line A. The two focal points of the ellipsoid 78 are also on its major axis. The light source 74 is located at the first focal point of the ellipsoid 78. The second focal point of the ellipsoid 78 is on the line A, indicated at 80. A plane 82 intersects line A perpendicularly at the second focal point 80. The plane 82 marks the location along the line A where the back wall 20a of the aperture cup 20 is located in the light projector 10, as seen in FIGS. 3 and 9, for example. More particularly, the aperture 20b lies at the second focal point 80 in FIG. 26. Another plane 84 perpendicularly intersects the line A at the location where a light beam contour masking device, such as the shutter mask blades 52 (FIG. 3), provides one or more openings to shape the profile of the light beam provided by the light projector 10. The two condensing lenses 24 and 26 are positioned between the plane 82 of the first aperture and the plane 84 of the masking device. The two projection lenses 44 and 46, separated by the spacer 50, are positioned beyond the plane 84.

In FIG. 26 lines A, B, C, D, and E represent light rays emanating from the light source 74. Ray A proceeds directly from the light source 74 through the aperture 26b at focal point 80, passes through the lenses 24 and 26 perpendicularly to all of the surfaces of those lenses, passes through the masking device in the plane 84, and passes through the lenses 44 and 46 perpendicularly to all of the surfaces of those lenses, and moves on to the object to be illuminated. Ray B proceeds directly from the light source 74 and intersects the aperture cup back wall 26a at plane 82. Rays C, D, and E are reflected at different angles by the surface of the reflector 72, then pass through the aperture 26b at the plane 82. The angle at which ray C passes through the aperture 20b at plane 82 is such that the ray passes through the lenses 24 and 26 at their extremities and is refracted only enough to be stopped by the masking device at the plane 84. Rays D and E are refracted by the lenses 24 and 26 depending on their respective angles of incidence on the lens surfaces, and pass through the masking device at plane 84 to the projection lenses 44 and 46, which further refract these rays into the beam projected toward the object to be illuminated. Because the light source 74 is a small, extended source and not a true point source, the light reaching the second focal point 80 has a high intensity over a small region of space somewhat larger than the light source size. The aperture 20b is sized to generally match this high intensity light region and the aperture cup 20 is devised to position the aperture 20b at the location of the second focal point 80. The aperture cup 20 also functions to trap a significant portion of the direct, non-reflected light from the light source permitting most of the light reaching the first condensing lens 24 to appear as if it was generated in the plane 82 of the aperture 20b. The aperture 20b is imaged by the set of condensing lenses 24 and 26 forming a real image at the location of the first projection lens 44. The masking device in the plane 84 determines the contour, or profile, of the light beam from the second condensing lens 26 that is imaged on the first projection lens 44. The projection lens set 44 and 46 is positioned to form an image of the masking device, in the plane 84, on the target to be illuminated.

Figure 27:
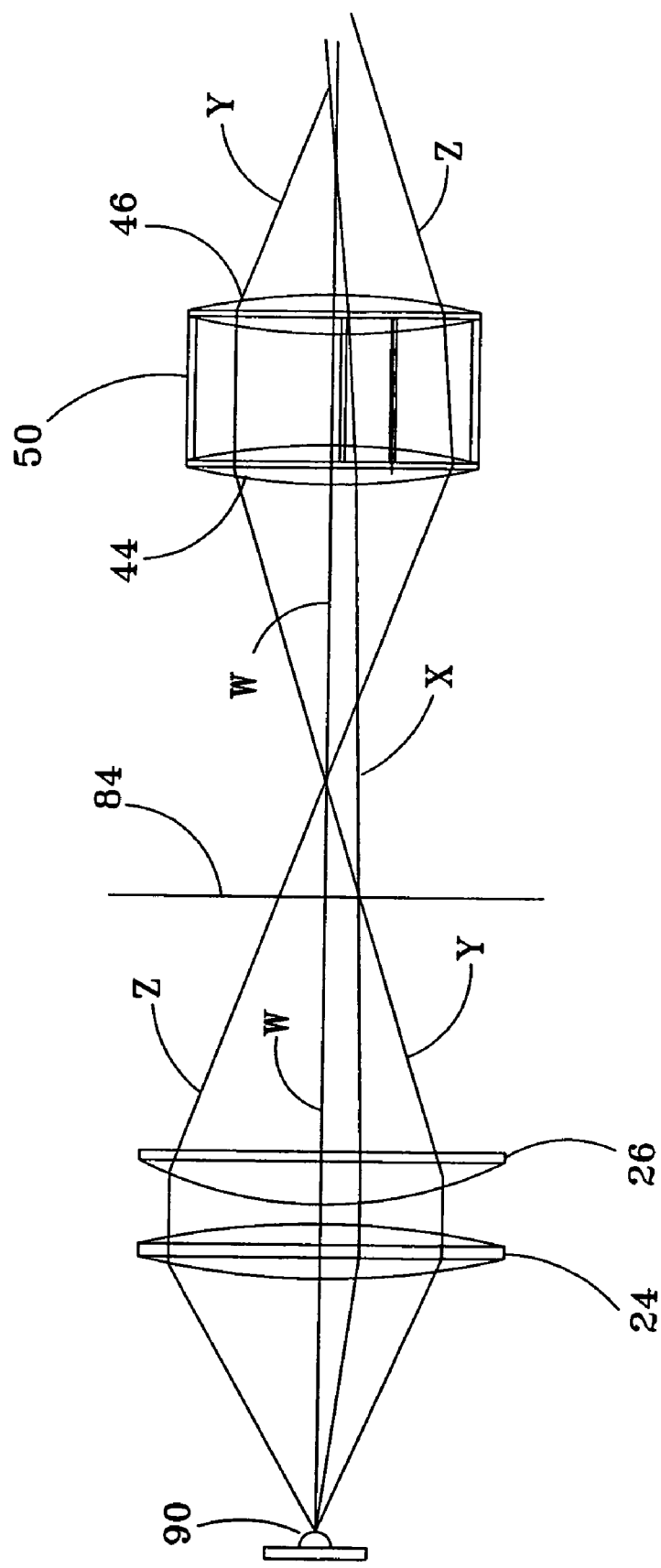
FIG. 27 is a view similar to FIG. 26 but illustrating the use of one or more light emitting diodes in place of a focusing lamp.

In an alternate embodiment one or an array of light emitting diodes approximating the size of the aperture 20b is placed at the location of the aperture 20b. FIG. 27 illustrates a ray diagram for such an embodiment. A light source 90 in the form of one or an array of light emitting diodes is positioned at the location of the aperture 20b in the aperture cup 20 (not shown). Additional optical devices, including condensing lenses 24 and 26, a masking device located at the plane 84, and the projection lenses 44 and 46 spaced apart by the spacer 50, are as shown in FIG. 26. Light from the source 90 is incident on the first condensing lens 24 in the same way that light from the aperture 20b with a focusing light source as described above. The image of the light source 90 is focused by the condensing lenses 24 and 26 on the first projection lens 44 after the profile of the condensed beam is shaped by the masking device at the plane 84. The shaped beam is then focused on the object to be illuminated (not shown) by the projection lenses 44 and 46. Ray W travels from the light source 90 along the axis of the optical system, being incident on all of the lens surfaces perpendicularly. Rays X, Y, and Z are incident on the lens surfaces at different angles, and are refracted differently accordingly. Any light from the source 90 that is not directed by the condensing lenses 24 and 26 into the opening in the masking device at the plane 84 will be captured, either by the aperture cup 20 or by the masking device. In order to achieve efficient light projection the light emitted from the light source 90 must illuminate the first condensing lens 24 without loss from a wide beam divergence.

It will be appreciated that the lamp 36 may generate substantial heat. If the light projector 10 is utilized in a cooled environment, such as an air conditioned room, each of the lenses 24, 26, 44 and 46 may be subject to a temperature differential that could cause fogging of the lens in the presence of sufficient humidity. This may be of particular concern in cases where the light projector 10 is positioned above a ceiling, or behind a wall, with only the front end of the lens sleeve 40 extending through the ceiling or wall into an air conditioned room while the remainder of the light projector is not so cooled. To minimize temperature differentials between various portions of the light projector 10, and thereby to avoid lens fogging, ventilation passages are provided from the interior of the light chamber assembly, through the region between the light chamber assembly and the interior surfaces of the main housing body 12 and the end cap 14, and to the exterior of the light projector 10. Heat can flow along the ventilation passages to effectively neutralize any significant temperature differentials that might otherwise result in fogging of any of the lenses. The ventilation passages are provided by the vent holes 18b and 18g in the lens holder 18, vent holes 20c in the aperture cup 20, vent holes 22c in the lamp tube 22, spaces between the lamp tube plate 30 and the interior surface of the main housing body 12, spaces between the lamp clamp plate and the interior surface of the end cap 14, and the spaces formed between the insets 28b of the back surface of the lock plate 28 and the front surface of the lens holder flange 18a (see FIG. 3), for example.

As is clear from the descriptions and illustrations of the embodiments disclosed herein, the present invention provides a light projector of improved construction wherein optical devices are held in place within a tubular light chamber which is coaxially enclosed and anchored within a housing assembly. The front end of the housing assembly is in the form of a focus cone that carries one or more projection lenses. A light beam contour mask device is positioned between the back end of the focus cone and a lock plate located at the front end of the generally cylindrical main housing body of the housing assembly.

The foregoing disclosure and description of the invention is illustrative and explanatory thereof, and various changes in the size, shape and materials as well as in the details of the illustrated construction may be made within the scope of the appended claims without departing from the spirit of the invention.

What is claimed is:

1. A light projector comprising:
   a. an elongate housing assembly;
   b. a tubular light chamber assembly comprising tubular components, having a back end and a front end and coaxially enclosed by the housing assembly;
   c. one or more condensing lenses held in place against annular shoulders within the light chamber assembly;
   d. a light source positioned behind the one or more condensing lenses;
   e. a transverse wall as part of the light chamber assembly, positioned behind the one or more condensing lenses and broken by an aperture coaxial with the light chamber assembly;
   f. a lock plate at the front end of the light chamber assembly, holding one of the one or more condensing lenses in place; and
   g. a projection lens in front of the lock plate.

2. A light projector as defined in claim 1 further comprising a light beam contour masking device positioned against the front of the lock plate to provide one or more openings to determine the contour of the light beam produced by the light projector.

3. A light projector as defined in claim 1 wherein the housing assembly comprises a generally cylindrical main housing body, an end cap at the back end of the housing assembly and a focus cone at the front end of the housing assembly, with the light chamber generally enclosed by the main housing body.

4. A light projector as defined in claim 3 wherein the focus cone further comprises a lens sleeve selectively positioned to extend the front end of the focus cone, and wherein the projection lens is located.

5. A light projector as defined in claim 3 further comprising a light beam contour masking device positioned against the front of the lock plate to provide one or more openings to determine the contour of the light beam produced by the light projector.

6. A light projector as defined in claim 1 further comprising ventilation passages from the interior of the light chamber assembly, through the region between the light chamber assembly and the interior surface of the housing assembly enclosing the light chamber assembly, and to the exterior of the light projector.

7. A light projector as defined in claim 1 wherein the light source is included in a lamp that focuses light, from the light source, at the aperture.

8. A light projector as defined in claim 1 wherein:
   a. the light source is included in a lamp that comprises a reflector providing a reflecting surface in the shape of a portion of an ellipsoid with its major axis coincident with the longitudinal axis of the tubular light chamber assembly;
   b. the light source is located at a first focal point of the ellipsoid, toward the reflecting surface; and
   c. the reflecting surface is positioned within the light projector such that the second focal point of the ellipsoid is at the location of the aperture.

9. A light projector as defined in claim 8 wherein the lamp comprises a halogen lamp with a small filament as the light source.

10. A light projector as defined in claim 8 wherein the lamp comprises a high intensity discharge lamp with the discharge as the light source.

11. A light projector as defined in claim 8 wherein the light source comprises one or more light emitting diodes.

12. A light projector as defined in claim 1 wherein the light source comprises one or more light emitting diodes located at the aperture.

13. A light projector comprising:
   a. an elongate housing assembly comprising a generally cylindrical main housing body, an end cap at the back end of the housing assembly and a focus cone at the front end of the housing assembly;
   b. a tubular light chamber assembly comprising a plurality of tubular components, having a back end and a front end, and coaxially enclosed by the main housing body;
   c. at least one condensing lens held in place against at least one annular shoulder within the light chamber assembly;
   d. a light source positioned behind the one or more condensing lenses;
   e. a transverse wall as part of the light chamber assembly, positioned behind the one or more condensing lenses, broken by an aperture coaxial with the light chamber assembly;
   f. a lock plate at the front end of the light chamber assembly and of the main housing body and behind the back end of the focus cone, coaxial with the light chamber assembly and the housing assembly; and
   g. at least one projection lens carried by the focus cone in front of the lock plate.

14. A light projector as defined in claim 13 further comprising a light beam contour masking device positioned between the back end of the focus cone and the lock plate to provide one or more openings to determine the contour of the light beam produced by the light projector.

15. A light projector as defined in claim 13 further comprising ventilation passages from the interior of the light chamber assembly, through the region between the light chamber assembly and the interior surfaces of the main housing body and the end cap, and to the exterior of the light projector.

16. A light projector as defined in claim 13 wherein the focus cone further comprises a lens sleeve selectively positioned to extend the front end of the focus cone, wherein two projection lenses are carried selectively longitudinally spaced apart.

17. A light projector as defined in claim 13 wherein the light source is included in a lamp that focuses light, from the light source, at the aperture.

18. A light projector as defined in claim 13 wherein:
   a. the light source is included in a lamp that comprises a reflector providing a reflecting surface in the shape of a portion of an ellipsoid with its major axis coincident with the longitudinal axis of the tubular light chamber assembly;
   b. the light source is located at a first focal point of the ellipsoid, toward the reflecting surface; and
   c. the reflecting surface is positioned within the light projector such that the second focal point of the ellipsoid is at the location of the aperture.

19. A light projector as defined in claim 18 wherein the lamp comprises a halogen lamp with a small filament as the light source.

20. A light projector as defined in claim 18 wherein the lamp comprises a high intensity discharge lamp with the discharge as the light source.

21. A light projector as defined in claim 18 wherein the light source comprises one or more light emitting diodes.

22. A light projector as defined in claim 13 wherein the light source comprises one or more light emitting diodes located at the aperture.

23. A light projector comprising:
   a. an elongate housing assembly comprising a generally cylindrical main housing body, an end cap at the back end of the housing assembly and a focus cone at the front end of the housing assembly;
   b. a tubular light chamber assembly having a back end and a front end, and coaxially enclosed by the housing assembly, comprising a generally tubular lens holder with annular, interior shoulders and located toward the front end of the tubular light chamber, a lamp tube received by the back end of the lens holder, a generally annular lamp tube plate receiving the back end of the lamp tube and locking to the back end of the main housing body, and a lamp clamp plate that latches to the lamp tube plate;
   c. an aperture cup received into the back end of the lens holder and including a transverse back wall having an aperture;
   d. a lamp that is held in place at least partially within the back end of the lamp tube by the lamp clamp plate;
   e. a lock plate that is held against the front end of the main housing body and the front end of the lens holder and behind the back end of the focus cone;
   f. a first condensing lens held in place against one of the annular shoulders within the lens holder by the front edge of the aperture cup;
   g. a second condensing lens held in place against another annular shoulder within the lens holder by the lock plate;
   h. a lens sleeve as part of the focus cone, selectively positioned to extend the front end of the focus cone;
   i. two projection lenses carried within the lens sleeve and selectively longitudinally spaced apart; and
   j. a light beam contour masking device positioned between the back end of the focus cone and the lock plate.

24. A light projector as defined in claim 23 further comprising vent holes in the lens holder, the aperture cup and the lamp tube, and insets in the back surface of the lock plate, providing ventilation passages from the interior of the light chamber assembly through the region between the light chamber assembly and the interior surface of the main housing body, and to the exterior of the light projector.

25. A light projector as defined in claim 23 wherein the lamp focuses light at the aperture.

26. A light projector as defined in claim 23 wherein:
   a. the lamp comprises a reflector providing a reflecting surface in the shape of a portion of an ellipsoid with its major axis coincident with the longitudinal axis of the tubular light chamber assembly;
   b. the lamp further comprises a light source located at a first focal point of the ellipsoid, toward the reflecting surface; and
   c. the reflecting surface is positioned within the light projector such that the second focal point of the ellipsoid is at the location of the aperture.

27. A light projector as defined in claim 26 wherein the lamp comprises a halogen lamp with a small filament as the light source.

28. A light projector as defined in claim 26 wherein the lamp comprises a high intensity discharge lamp with the discharge as the light source.

29. A light projector as defined in claim 26 wherein the light source comprises one or more light emitting diodes.

30. A light projector comprising:
   a. an elongate housing assembly comprising a generally cylindrical main housing body, an end cap at the back end of the housing assembly and a focus cone at the front end of the housing assembly;
   b. a tubular light chamber assembly comprising a plurality of tubular components, having a back end and a front end, and coaxially enclosed by the main housing body;
   c. a lamp at the back end of the light chamber assembly comprising a reflector providing a reflecting surface in the shape of a portion of an ellipsoid with its major axis coincident with the longitudinal axis of the tubular light chamber assembly and a light source coincident with a first focal point of the ellipsoid, toward the reflecting surface;
   d. at least one condensing lens held in place against at least one annular shoulder within the light chamber assembly;
   e. a transverse wall within the light chamber assembly between the lamp and the one or more condensing lenses, broken by an aperture coaxial with the light chamber assembly and coincident with the second focal point of the ellipsoid;
   f. a lock plate at the front end of the light chamber assembly and of the main housing body and behind the back end of the focus cone, coaxial with the light chamber assembly and the housing assembly;
   g. a light beam contour masking device positioned between the back end of the focus cone and the lock plate;
   h. a lens sleeve as part of the focus cone, selectively positioned to extend the front end of the focus cone; and
   i. two projection lenses carried within the lens sleeve and selectively longitudinally spaced apart.

31. A light projector as defined in claim 30 wherein the lamp further comprises a halogen lamp and the light source comprises a filament.

32. A light projector as defined in claim 30 wherein the lamp further comprises a high intensity discharge lamp and the light source comprises the discharge.

33. A light projector as defined in claim 30 wherein the lamp further comprises one or more light emitting diodes.

* * * * *